United States Patent
Sumiya et al.

(10) Patent No.: US 6,737,377 B1
(45) Date of Patent: *May 18, 2004

(54) CUTTING TOOL OF A CUBIC BORON NITRIDE SINTERED COMPACT

(75) Inventors: Hitoshi Sumiya, Hyogo (JP); Shinya Uesaka, Hyogo (JP)

(73) Assignee: Sumitomo Electric Industries, Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/462,876

(22) PCT Filed: May 20, 1999

(86) PCT No.: PCT/JP99/02655
§ 371 (c)(1),
(2), (4) Date: Jan. 18, 2000

(87) PCT Pub. No.: WO99/61391
PCT Pub. Date: Dec. 2, 1999

(30) Foreign Application Priority Data

May 22, 1998 (JP) .......................... 10-141366
May 26, 1998 (JP) .......................... 10-143606

(51) Int. Cl.$^7$ .................................... C04B 35/5831
(52) U.S. Cl. ................................. 501/96.4; 423/290
(58) Field of Search .................. 501/96.4; 423/290

(56) References Cited

U.S. PATENT DOCUMENTS 4,749,556 A * 6/1988 Parrish et al. .............. 423/290
4,784,978 A * 11/1988 Ogasawara et al. ........ 501/96.4
5,443,605 A * 8/1995 Suzuki et al. .............. 501/96.4
5,691,260 A * 11/1997 Suzuki et al. .............. 501/96.4
5,985,228 A * 11/1999 Corrigan et al. ............ 423/290
6,071,841 A * 6/2000 Sumiya ....................... 501/96.4
6,096,671 A * 8/2000 Kawasaki et al. .......... 501/96.4

FOREIGN PATENT DOCUMENTS

| JP | 47-34099 | 11/1972 |
| JP | 49-27518 | 7/1974 |
| JP | 55-167110 | 12/1980 |
| JP | 61-117107 | 6/1986 |
| JP | 63-394 | 1/1988 |
| JP | 3-37161 | 2/1991 |
| JP | 3-159964 | 7/1991 |
| JP | 8-47801 | 2/1996 |
| JP | 8-141822 | 6/1996 |
| JP | 9-59068 | 3/1997 |
| JP | 10-158065 | 6/1998 |

OTHER PUBLICATIONS

Translation of Japanese document 9–59068, publication date Mar. 4, 1997.*

* cited by examiner

Primary Examiner—Karl Group
(74) Attorney, Agent, or Firm—McDermott, Will & Emery

(57) ABSTRACT

The object of the present invention is to provide a cutting tool consisting of fine grain cBN free from a binder and having a grain size of at most 1 $\mu$m and having a high hardness, high strength and excellent heat resistance. The feature thereof consists in a cutting tool compring, as an edge part, a cubic boron nitride sintered compact containing cubic boron nitride having an average grain diameter of at most 1 $\mu$m, in which the cubic boron nitride sintered compact has, at the said edge part, an $I_{(220)}/I_{(111)}$ of (220) diffraction intensity ($I_{(220)}$) to (111) diffraction intensity ($I_{(111)}$) ratio of at least 0.05 in X-ray diffraction of arbitrary direction and impurities are substantially not contained in the grain boundaries.

6 Claims, No Drawings

CUTTING TOOL OF A CUBIC BORON NITRIDE SINTERED COMPACT

TECHNICAL FIELD

This invention relates to a milling cutter suitable for high speed cutting with a long service life, such as a face mill or end mill for a work-piece of cast iron or steel, and a cutting tool suitable for precision cutting of ferrous materials, and a process for the production of the same.

BACKGROUND TECHNIQUE

In the production of an engine or a driving part of a car, or parts used in electric appliances, high speed steel tools, cemented carbide tools, coating tools, ceramic tools or cubic boron nitride sintered compact tools (which will hereinafter be referred to as "cBN tool") have been used for face milling cutters or end mills for cutting cast irons or steels as the materials of the parts.

The cutting speed of a cemented carbide tool or coating tool as the face milling cutter for cutting cast irons is 150 to 250 m/min and the cutting speed practically used in ceramic tools about 400 m/min. On the other hand, in a cBN tool excellent in wear resistance as well as high speed cutting property, a cutting speed of 500 to 1500 m/min is possible by dry process, as proposed in JP-A-8-141822. When a workpiece is markedly subject to influences such as deformation or strain by heat generated during dry process cutting, or when such a part is treated that slight deformation due to heat is considered as a problem, however, cutting must have been effected while decreasing the cutting speed to such an extent that any deformation due to heat does not occur by wet process cutting using a cutting fluid and thermal cracks do not occur at the cutting edge of the cBN tool. That is to say, in the case of wet process cutting, a practically used range for the cutting speed should be 500 to 700 m/min and at a cutting speed exceeding this range, thermal cracks occur at the cutting edge of the tool to remarkably decrease the tool service life. This is due to that in dry process cutting using no cutting fluid, the temperature difference of the heat cycle is so small that the edge part of the cBN tool can resist thermal shock, while in high speed cutting by wet process, the cutting edge at a high temperature during contacting with a work-piece is rapidly cooled during air cutting, so that thermal cracks occur by the heat cycle imparted to the cutting edge.

The practically used cutting speed of a cemented carbide tool or coating tool as a face milling cutter for cutting steels is about 50 to 200 m/min. At a higher speed than this range, the cutting edge encounters rapid wearing or breakage to markedly decrease the tool life. In the case of a cBN tool, cutting is possible at a cutting speed comparable to that of the cemented carbide tool, but the cBN tool has not practically been used as the face milling cutter for cutting steels, since the cBN tool has an equal tool life to the cemented carbide and at a higher speed cutting than this range, the cutting edge encounters breakage due to lowering of the strength of the sintered compact with increase of the temperature of the cutting edge, and occurrence of thermal cracks resulting in marked lowering of the tool life.

The practically used cutting speed of a cemented carbide tool or coating tool as an end mill for cutting cast iron is about 30 to 150 m/min. In a cBN tool, on the other hand, a cutting speed of 100 to 1500 m/min is possible by dry process. By wet process, however, a cutting speed of 100 to 300 m/min is practically used, and at a cutting speed of more than this range, thermal cracks occurs on the cutting edge to markedly lower the tool life in the similar manner to the face milling cutter.

The practically used cutting speed of a cemented carbide tool or coating tool as an end mill for cutting steels is about 30 to 100 m/min. Under a condition of a relatively low cutting speed in a cBN tool, a tool life comparable to that of the cemented carbide tool is only obtained in the similar manner to the face milling cutter, and at a higher speed cutting, the cutting edge of a cBN tool encounters breakage due to lowering of the strength of the sintered compact with increase of the temperature of the cutting edge, and occurrence of thermal cracks resulting in marked lowering of the tool life, so that the cBN tool has not practically been used as the end mill for cutting steels, The lowering of the service life of a cBN tool under the above described conditions is probably due to the following reasons. A cBN compact of the prior art is obtained by sintering cBN powder grains with a binder such as TiN, TiC, Co, etc. at an ultra-high pressure and contains 10 to 60 volume % of the binder. Since the cBN compact has a thermal conductivity of less than 200 W/m·K and a thermal expansion coefficient at 20 to 600° C. of at least $4.0 \times 10^{-6}$/K, it is considered due to that a larger temperature gradient is caused in the vicinity of a cutting edge by the lower thermal conductivity for the temperature difference of a heat cycle during cutting steels or wet process cutting cast irons, a higher tensile stress is caused on the cutting edge during cooling and furthermore, larger extent expansions and shrinkages are repeated to readily cause thermal cracks by the higher thermal expansion coefficient. In addition, it is considered due to that even if the transverse rupture strength as the bending strength at room temperature is at least 80 $kgf/mm^2$, the transverse rupture strength ia rapidly lowered at a temperature of at least 800° C.

Therefore, to this end, a tool is required which does not contain any binder at its edge part, does have a high thermal conductivity and low thermal expansion coefficient and does not meet with decrease of the strength even at a high temperature.

On the other hand, lately, requirements for high precision finishing cutting working of high hardness ferrous materials are increasing. For the precision working of the ferrous materials, single crystal diamond and single crystal cubic boron nitride have been investigated.

In the case of cutting a ferrous material by single crystal diamond, however, there arises a problem that a chemical reaction of diamond and iron takes place by cutting heat, resulting in rapid wear of the diamond tool and thus, direct working of a metallic mold of steels, etc. is impossible. Accordingly, in the precision working of a metallic mold for a lens, for example, a method comprising applying an electroless nickel plating layer and precisely finishing the plated layer has been adopted, but this method meet with such a problem that the strength of the metallic mold is not sufficient and the process is complicated. The direct working has been investigated based on a method for suppressing chemical reactions using a special atmosphere, but this is not practical.

Cubic boron nitride (cBN) is a material having a hardness next to diamond and high thermal and chemical stability, whose reactivity with ferrous metals is low. However, a cBN compact having at present been used as a cutting tool is obtained by sintering cBN powder grains with a binder such as TiN, TiC, Co, etc. at an ultra-high pressure and contains 10 to 60 volume % of the binder, as described above. Thus, during shaping the cutting edge, a fine chipping edge tends to occur and it is very difficult to sharply finish the cutting edge without chipping of the edge, so that use thereof as a precision cutting tool be difficult. In order to solve this problem, it is necessary to prepare a tool from a single crystal of cBN or free from a binder. Therefore, a trial for preparing a single crystal of cBN and using as a cutting tool for ultra-precision working of steels has been made, but synthesis of a large-sized cBN single crystal with less impurities and defects is very difficult and a cBN single crystal has a number of cleavage planes, so that the strength is low and the wear resistance is not sufficient. Accordingly, the cBN single crystal has not been put to practical use up to the present time.

As apparent from the foregoing illustrations, it is considered that both of a cutting tool for subjecting cast irons or steels to high speed milling working and a cutting tool suitable for precision cutting of ferrous materials can be realized by a cBN compact tool free from binders.

As the cBN compact tool free from binders, there is a compact obtained by subjecting hexagonal boron nitride (which will hereinafter be referred to as hBN) as a raw material to reaction sintering using magnesium boronitride, etc., as a catalyst. This compact comprises cBN grains strongly bonded with each other, being free from a binder and having a thermal conductivity of 600 to 700 W/m·K, which is applied to heat sink materials or TAB bonding tools. Since there remain some catalyst in this compact, however, fine cracks tend to occur due to difference between catalyst and cBN in thermal expansion when heat is added. Thus, the heat resistance temperature is low, i.e. about 700° C., resulting in a large problem as a cutting tool. Moreover, the grain diameter is so large as represented by approximately 10 μm that the strength is not sufficient although the thermal conductivity is high and the compact cannot be applied to a cutting tool.

On the other hand, cBN can be synthesized (directly converted) at an ultra-high pressure and high temperature from BN of normal pressure type, e.g hBN without using any catalyst. It is known that a binder-free cBN sintered compact can be produced by direct conversion of hBN→cBN with simultaneous sintering.

For example, JP-A-47-34099 and JP-A-3-159964 disclose a method comprising converting hBN into cBN at an ultra-high pressure and high temperature and thus obtaining a cBN sintered compact. In addition, JP-B-63-394 and JP-A-8-47801 disclose a method comprising preparing cBN from pyrolytic boron nitride (which will hereinafter be referred to as pBN). However, these cBN sintered compacts have the problems that compressed hBN crystal grains at an ultra-high pressure tends to remain in the cBN sintered compact and exhibit strong orientation property (anisotropic property) of cBN crystals, resulting in laminar cracking or stripping.

Furthermore, as a method of obtaining cBN by direct conversion, for example, JP-B-49-27518 discloses using hexagonal boron nitride, as a raw material, having an average grain diameter of primary grains in a range of at most 3 μm. However, the thus obtained cBN cannot be applied to a cutting tool, because hexagonal boron nitride in the form of fine powder contains several %, of boron oxide impurity and adsorbed gases, so that sintering does not sufficiently proceed, and the sintered compact contains such a large amount of the oxide as not giving high hardness, high strength and excellent heat resistance.

Since the cBN sintered compact of the prior art, containing a binder, has a low thermal conductivity and large thermal expansion coefficient and tends to encounter thermal cracks by a large load of the heat cycle and further, the strength is decreased at a high temperature, cutting of cast irons by wet process or high speed milling of steels is impossible. In addition, no sharp cutting edge can be obtained, the strength or wear resistance of the cutting edge is not sufficient and accordingly, precision cutting working of ferrous materials is impossible. As to a cBN single crystal, synthesis of a large sized cBN single crystal with less impurities and defects is very difficult and its strength is low and wear resistance is not sufficient. Thus, cBN encounters breakage of the cutting edge or wearing by microchipping through cleavage of (110) plane or (111) plane.

If a sintered compact of cBN single phase free from a binder, in which structure grains are fine and strongly bonded with each other, can be obtained by direct conversion, it is considered that the sintered compact has a high thermal conductivity and small thermal expansion coefficient and the transverse rupture strength is not lowered even at a high temperature, so that breakage due to thermal cracks can be suppressed and high speed milling of cast irons by wet process or high speed milling of steels is rendered possible. Furthermore, a sharp cutting edge can be formed by fine granulation of cBN, the edge breakage or wearing due to cleavage can be improved and the precision machining of ferrous materials can be carried out.

In the binder-free cBN sintered compact of the prior art, however, as described above, the grain diameter is large, i.e. several μm and further, there are present the catalyst, compressed hBN, oxides, etc. in the grain boundaries to lower the transverse rupture strength and heat resistance temperature, so that the tool edge does not have an edge strength required for milling cutting being at a high temperature and a sharp cutting edge required for a precision cutting tool cannot be obtained. In the direct conversion method of the prior art, hBN as a raw material tends to be orientated and to become a sintered compact orientated in (111) direction. When pBN originally having a high orientation is used as a raw material, there is obtained a cBN sintered compact more orientated in (111) direction than in the case of using hBN as a raw material. Because of this orientation, there arises a problem that when using it as a cutting tool, disadvantages such as laminar cracks or strippings take place. A sintered compact of cBN single phase being isotropic and finely granular and having such a high bonding strength among grains as to be applied to cutting use has not been known up to the present time.

In the case of carrying out cutting of cast irons by wet process using the cBN tool of the prior art, therefore increasing the cutting speed so as to be similar to cutting by dry process results in decrease of the tool life in any of the face milling or end mill, consequently, raising the production cost.

For milling steels, inrease of the cutting speed using a cBN tool results in only lowering of the tool life and even at the generally employed working speed of a cemented carbide tool, the use of an expensive cBN tool having a similar service life to a cemented carbide tool raises the cost of cutting process. This is not preferable.

However, in recent years, mechanical working machines capable of high speed rotation have been developed one after another and high speed cutting is indispensable in order to improve the working efficiency and reduce the cost. In such a mechanical working machine, it is eagerly desired to provide a cutting tool capable of corresponding to high speed cutting of steels and wet process cutting so as to suppress influences upon a workpiece due to rising of the cutting temperature during cutting a part of cast iron.

The inventors have made efforts to solve various problems of the prior art, as described above, in milling cutters and precision cutting tools such as cBN tools, in particular, face milling cutters or end mills and consequently, have reached the present invention.

The principal object is to provide a milling cutter using cBN, being free from binders and having a grain size of at most 1 μm, and having a high thermal conductivity and small thermal expansion coefficient and being excellent in strength as well as wear resistance, because of containing no impurity in the grain boundaries and having an isotropic structure, whereby to exhibit high speed cutting of a cutting speed of at least 800 m/min, preferably at least 1000 m/min in the case of a face mill cutter for cutting cast iron by wet process; high speed cutting of a cutting speed of at least 300 m/min, preferably at least 500 m/min by wet process in the case of an end mill; a cutting speed of at least 200 m/min in the case of a face mill cutter for cutting steels by dry process and wet process; and a cutting speed of at least 150 m/min in the case of an end mill for cutting steels by dry process and by wet process, and whereby to achieve a sufficient tool life.

The second object is to provide a precision cutting tool consisting of fine grain cBN free from binders and having a grain size of at most 0.5 μm, and having a very sharp cutting edge, because of containing no impurity in the grain boundary and having an isotropic structure.

DISCLOSURE OF INVENTION

The present invention is constructed of the following summarized inventions and embodiments.

(1) A cutting tool compring, as an edge part, a cubic boron nitride sintered compact containing cubic boron nitride having an average grain diameter of at most 1 μm, in particular, at most 0.5 μm, in which the cubic boron nitride sintered compact has, at the said edge part, an $I_{(220)}/I_{(111)}$ of (220) diffraction intensity ($I_{(220)}$) to (111) diffraction intensity ($I_{(111)}$) ratio of at least 0.05, in particular, at least 0.1 in X-ray diffraction of arbitrary direction and impurities are substantially not contained in the grain boundaries.

(2) The cutting tool as described in the above (1), wherein the thermal conductivity of the cubic boron nitride sintered compact, at the said edge part, is 250 to 1000 W/m·K.

(3) The cutting tool as described in the above (1) or (2), wherein the transverse rupture strength of the said cubic boron nitride sintered compact is at least 80 kgf/mm² by a three point bending measurement at a temperature between 20° C. and 1000° C.

(4) The cutting tool as described in any one of the above (1) to (3), wherein the hardness of the cubic boron nitride sintered compact, at the said edge part, is at least 4000 kgf/mm² at room temperature.

(5) The milling cutter as described in any one of the above (1) to (4), wherein the thermal conductivity of the cubic boron nitride sintered compact, at the said edge part, is 300 to 1000 W/m·K.

(6) The milling cutter as described in any one of the above (1) to (5), wherein the thermal expansion coefficient of the cubic boron nitride sintered compact, at the said edge part, is 3.0 to 4.0×10⁻⁶/K at a temperature ranging from 20° C. to 600° C.

(7) The milling cutter as described in any one of the above (1) to (6), which is applied to a face milling cutter or end mill for high speed cutting cast irons or steels.

(8) The precision cutting tool as described in any one of the above (1) to (4), wherein the cubic boron nitride sintered compact, at the said edge part, contains cBN with an average grain diameter of at most 0.5 μm.

(9) A process for the production of a sintered compact for a cutting tool containing cubic boron nitride with an average grain diameter of at most 1 μm, in particular, at most 0.5 μm, which comprises reducing and nitriding a compound containing boron and oxygen in the presence of carbon and nitrogen to synthesize a low pressure phase boron nitride and subjecting the resulting low pressure phase boron nitride, as a starting material, to direct conversion into cubic boron nitride at a high temperature and high pressure, while simultaneously sintering.

(10) The process for the production of a sintered compact for a cutting tool, as described in the above (9), wherein the said direct conversion and sintering are carried out at a pressure of at least 6 GPa and a temperature of 1550 to 2100° C.

BEST EMBODIMENTS FOR CARRYING OUT PRESENT INVENTION

As described above, a cBN sintered compact for composing the cutting tool of the present invention contains no binder, comprises cBN of at most 1 μm, contains no impurities at grain boundaries and has an isotropic structure, which can favorably be used as a milling cutter for high speed machining, having a high thermal conductivity and low thermal expansion coefficient and being excellent in strength as well as wear resistance. If cBN is of fine grains with a grain size of at most 0.5 μm, there can be obtained a tool having a sharp cutting edge and higher strength and wear resistance, which can preferably be applied to a precision cutting use.

The cBN sintered compact of the cutting tool according to the present invention is obtained by subjecting low crystallinity BN or fine grain, normal pressure type BN free from adsorbed gases or boron oxide, as a starting material, to direct conversion into cBN, followed by sintering, at a high pressure and high temperature. It is required that the low crystallinity BN or fine grain, normal pressure type BN used herein is prepared by reducing boron oxide or boric acid with carbon, followed by nitriding. As a method of synthesizing BN of normal pressure type, it is generally and industrially carried out to react boron oxide or boric acid with ammonia. However, when the thus obtained BN is heat treated at a high temperature, it is crystallized into hBN. Thus, even if fine grain, low crystallinity BN of normal pressure type is synthesized by this method, it is crystallized into hBN and subject to grain growth by a high temperature puirification treatment to remove boron oxide as an impurity (at least 2050° C. in nitrigen gas, at least 1650° C. in vacuum). In contrast, the normal pressure type BN prepared by reducing boron oxide or boric acid with carbon, followed by nitriding, has such a feature that it is not crystallized even if heat-treated at a high temperature. Accordingly, the boron oxide- or adsorbed gases-free normal pressure type BN suitable for direct conversion and sintering can be obtained by synthesizing the fine grain and low crystallinity normal pressure type BN by this method and subjecting it to a high purity purification treatment in a nitrogen atmosphere at 2050° C. or higher or in vacuum at 1650° C. or higher. The above described reducing and nitriding can be carried out using nitrogen and carbon as a heating source.

Since according to the present invention, the starting material is the fine grain and atmospheric pressure type BN and does not contain boron oxide hindering the cBN conversion, compressed hBN often appearing in the prior art direct conversion method does not remain and there is less grain growth or less monoaxial orientation in the cBN after the direct conversion. Consequently, an isotropic sintered compact consisting of fine grains is obtained, whose bonding strength among the grains is higher because of absence of boron oxide hindering sintering of cBN grains with each other.

A preferable condition for the above described direct conversion is a pressure of at least 6 GPa and a temperature of 1550 to 2100° C. In particular, the sintering temperature is more important, since if lower than the the range, the conversion into cBN is not sufficient, while if higher than it, grain growth of cBN proceeds to decrease the bonding strength of cBN grains with each other. The sintering temperature, at which grain growth of cBN does not occur, varies with the crystallinity and grain diameter of the starting material. The cBN sintered compact, sintered in the above described suitable sintering temperature range, has such a feature that the compact has a dense structure comprising cBN with an average grain diameter of at most 1.0 $\mu$m, preferably 0.5 $\mu$m, contains no impurity in the grain boundaries, and has an isotropic structure.

Control of the grain diameter of cBN is generally carried out at a temperature during the direct conversion. That is, in order to control the fine grain state of at most 1.0 $\mu$m, it is necessary to use the fine grain and low crystallinity normal pressure type BN and subject it to direct conversion at a low temperature range. When using ordinary hBN or pBN, the conversion into cBN does not occur unless the temperature is raised to 2100° C. or higher and accordingly, it is impossible to control to a grain size of at most 1.0 $\mu$m.

When the cBN sintered compact obtained in this way is applied to a material for a milling cutter or precision cutting tool, there is obtained a very sharp and high strength cutting edge having a high thermal conductivity and low thermal expansion coefficient and being rendered possible high speed milling and precision cutting, which have been considered difficult in the prior art.

The cutting tool according to the present invention has a cutting edge consisting of a sintered compact comprising a cubic boron nitride (cBN) having an average grain diameter of at most 1.0 $\mu$m, obtained by subjecting a low pressure phase boron nitride to direct conversion at a high pressure and high temperature and simultaneously, to sintering, the cBN sintered compact having an $I_{(220)}/I_{(111)}$ of (220) diffraction intensity ($I_{(220)}$) to (111) diffraction intensity ($I_{(111)}$) ratio of at least 0.05, in particular, at least 0.1 in X-ray diffraction of arbitrary direction and impurities subtantially not contained in the grain boundaries. When the average grain diameter of cBN exceeds 1 $\mu$m, an edge strength required for milling cannot be obtained. When the average grain diameter of cBN exceeds 0.5 $\mu$m, a cutting edge has not a sharpness sufficient for precision cutting and the strength is not sufficient. If the X-ray diffraction intensity ratio, $I_{(220)}/I_{(111)}$ is less than 0.05, the cBN sintered compact exhibits a strong orientation in <111> direction, i.e. being anisotropic, so that laminar cracks or strippings tend to occur.

Preferably, the edge part of the cBN sintered compact has a transverse rupture strength of at least 80 kgf/mm², whose strength is not lowered even at a high temperature. If less than 80 kgf/mm² or the strength is lowered at a high temperature, a cuttinn edge having a sufficient strength cannot be obtained and breakage tends to occur. The hardness of the cBN sintered compact, at an edge part, is preferably at least 4000 kgf/mm². If less than 4000 kgf/mm², wearing during cutting is large, the service life is shortened and a precision cutting cannot be carried out.

The edge part of the cBN sintered compact preferably has a thermal conductivity of at least 250 W/m·K and a thermal expansion coefficient of at most $4.0 \times 10^{-6}$/K. If the thermal conductivity is less than 250 W/m·K, a large temperature gradient is formed during cutting in the vicinity of the cutting edge to cause a high tensile stress at the cutting edge during cooling, whileif the thermal expansion coefficient is more than $4.0 \times 10^{-6}$/K, the cutting edge repeatedly expands and shrinks by the heat cycle during cutting, thus forming thermal cracks at the edbe part and markedly shortening the service life of the tool.

As illustrated above, the cBN sintered compact for the cutting tool of the present invention contains no binder, contains no impurities at grain boundaries and has an isotropic structure, so there can be obtained a cutting edge having a high thermal conductivity and low thermal expansion coefficient and being excellent in heat resistance cracking property and strength, whereby high speed milling is rendered possible. Thus, a longer serveice life than that of the prior art tools can be given when using as a cutting tool for wet process cutting of cast irons or high speed milling of steels. Furthermore, a sharp cutting edge capable of effecting precision working and being excellent in strength as well as wear resistance can be obtained by composing the cutting edge of fine grain cBN. When using the cutting tool of the present invention for precision working of ferrous materials, therefore, excellent properties can be realized which cannot be found in the prior art sintered compact.

The present invention will now be illustrated in detail without limiting the same.

EXAMPLES

A milling cutter and precision cutting tool were prepared by the process for the production according to the present invention and subjecting to cutting tests, thus obtaining results illustrated below:

Example 1

An exemplified process for the production of a cBN sintered compact composing a cutting edge will be illustrated in the following:

Boron oxide ($B_2O_3$) and melamine ($C_3N_6H_6$) were combined in a mole proportion of 3:1 and uniformly mixed in a mortar. Then, the mixture was treated in nitrogen gas atmosphere in a tubular furnace at a synthesis temperature of 850° C. for 2 hours. The resulting powder was washed with ethanol to remove unreacted $B_2O_3$ and further treated in nitrogen gas in a high frequency furnace at 2100° C. for 2 hours. The oxygen content in the resulting boron nitride powder, measured by gas analysis, was 0.75 weight %. This oxygen is regarded as an impurity dissolved in hBN, since $B_2O_3$ and adsorbed gases were completely removed by the heat treatment in nitrogen gas at 2100° C.

In an X-ray diffraction pattern of the resulting boron nitride, there was no (102) diffraction line of hBN and (002) diffraction line of hBN was so broad that its crystallinity was considerably low. Calculation of a crystallite size Lc from the half-band width of hBN (002) diffraction line taught 8 nm. This low crystallinity, normal pressure type BN powder was compressed by 6 ton/cm² and molded, and the resulting molding was treated again in nitrogen gas in a high frequency furnace at 2100° C. for 2 hours.

The synthesized low crystallinity, normal pressure type BN molding was charged in a Mo capsule and treated at 6.5 GPa and 1800° C. for 15 minutes in an ultra-high pressure-producing apparatus of Belt type. Thus, it was found by X-ray diffraction analysis that the resulting sintered compact was composed of only cBN. In the X-ray diffraction of this cBN, the ratio of (220) diffraction intensity of cBN to (111) diffraction intensity of cBN was found to be 0.22, thus teaching that it was an isotropic sintered compact with less orientation. When the microstructure of this cBN sintered compact was observed by a transmission electron microscope, it was found that the cBN had a fine grain size, i.e. at most 0.3 μm and formed a dense structure of grains bonded with each other. In addition, when this hardness was measured by a microknoop indenter, it was high hardness, i.e. 5000 kgf/mm². When this sintered compact was worked into a rectangular parallelepiped with 6×3×1 mm, after which the surface was mirro-wise polished, and subjected to measurement of its transverse rupture strength at a condition of a span interval of 4 mm, high transverse rupture strength was given, i.e. 110 kgf/mm² at room temperature and 120 kgf/mm² at 1000° C. The heat resistance was measured by a change of the hardness after a high temperature treatment in vacuum using a vacuum furnace, thus obtaining a result that the compact was stable up to 1300° C. and excellent in heat resistance. The thermal conductivity of the sintered compact measured, after working into a rectangular parallelepiped with 5×4×1 mm, in conventional manner at 50 to 60° C. was 290 W/m·K and the thermal expansion coefficient measured in a temperature range of 20° C. to 600° C. was $3.7 \times 10^{-6}$/K.

Example 2

The same low crystallinity, normal pressure type BN molding as that of Example 1 was charged in a Mo capsule and treated at 6.5 GPa and 1880° C. for 15 minutes in an ultra-high pressure-producing apparatus of Belt type. The resulting cBN sintered compact exhibited a ratio of (220) diffraction intensity of cBN to (111) diffraction intensity of cBN in X-ray diffraction was found to be 0.12. When the microstructure of this cBN sintered compact was observed by a transmission electron microscope, it was found that the cBN had a fine grain size, i.e. at most 0.5 μm and formed a dense structure of grains bonded with each other. In addition, when this hardness was measured by a microknoop indenter, it was high hardness, i.e. 5000 kgf/mm². The transverse rupture strength of this sintered compact was high, i.e. 105 kgf/mm² at room temperature, and the thermal conductivity at 50 to 60° C. was 340 W/m·K, while the thermal expansion coefficient measured in a temperature range of 20° C. to 600° C. was $3.6 \times 10^{-6}$/K.

Example 3

The same low crystallinity, normal pressure type BN molding as that of Example 1 was charged in a Mo capsule and treated at 6.5 GPa and 1950° C. for 15 minutes in an ultra-high pressure-producing apparatus of Belt type. The resulting cBN sintered compact exhibited a ratio of (220) diffraction intensity of cBN to (111) diffraction intensity of cBN in X-ray diffraction was found to be 0.08. When the microstructure of this cBN sintered compact was observed by a transmission electron microscope, it was found that the cBN had a fine grain size, i.e. 0.5 to 1 μm and formed a dense structure of grains bonded with each other. In addition, when this hardness was measured by a microknoop indenter, it was high hardness, i.e. 5050 kgf/mm². The transverse rupture strength of this sintered compact was high, i.e. 92 kgf/mm² at room temperature, and the thermal conductivity at 50 to 60° C. was 380 W/m·K, while the thermal expansion coefficient measured in a temperature range of 20° C. to 600° C. was $3.5 \times 10^{-6}$/K.

Example 4

The same low crystallinity, normal pressure type BN molding as that of Example 1 was charged in a Mo capsule and treated at 6.5 GPa and 2000° C. for 15 minutes in a ultr-high pressure-producing apparatus of Belt type. The resulting cBN sintered compact exhibited a ratio of (220) diffraction intensity of cBN to (111) diffraction intensity of cBN in X-ray diffraction was found to be 0.08. When the microstructure of this cBN sintered compact was observed by a transmission electron microscope, it was found that the cBN had a fine grain size, i.e. 0.5 to 1 μm and formed a dense structure of grains bonded with each other. In addition, when this hardness was measured by a microknoop indenter, it was high hardness, i.e. 4800 kgf/mm². The transverse rupture strength of this sintered compact was high, i.e. 88 kgf/mm² at room temperature, and the thermal conductivity at 50 to 60° C. was 440 W/m·K, while the thermal expansion coefficient measured in a temperature range of 20° C. to 600° C. was $3.5 \times 10^{-6}$/K.

Example 5

Boron nitride was synthesized and purified in an analogous manner to Example 1, except that the temperature for synthesizing the low crystallinity, normal pressure type BN, as a starting material, was 800° C. and the treatment was carried out for 2 hours. The oxygen content in the resulting normal pressure type BN powder, measured by gas analysis, was 0.8 weight %. In an X-ray diffraction pattern of the resulting boron nitride, there was no (102) diffraction line of hBN and (002) diffraction line of hBN was so broad that the boron nitride be of fine grains and its crystallinity be considerably low. Lc obtained from the half-band width of hBN (002) diffraction line was about 6 nm. This low crystallinity, normal pressure type BN powder was used as a raw material and a cBN sintered compact was prepared in the similar manner to Example 1. When the resulting cBN sintered compact was observed by a scanning electron microscope, it was found that the compact was fine as represented by a grain dimater of at most 0.5 μm. In the X-ray diffraction of this cBN, the ratio of (220) diffraction intensity of cBN to (111) diffraction intensity of cBN was found to be 0.26, thus teaching that it was an isotropic sintered compact. The grain diameter, hardness, strength and heat resistance of this cBN sintered compact were similar to those of Example 1.

Example 6

Boron nitride was synthesized and purified in an analogous manner to Example 1, except that the temperature for synthesizing the low crystallinity, normal pressure type BN was 950° C. and the treatment was carried out for 2 hours. The oxygen content in the resulting normal pressure type BN powder, measured by gas analysis, was 0.65 weight %. In an X-ray diffraction pattern of the resulting boron nitride, there was no (102) diffraction line of hBN and (002)

diffraction line of hBN was so broad that its crystallinity be low. Lc obtained from the half-band width of hBN (002) diffraction line was about 15 nm. This low crystallinity, normal pressure type BN powder was used as a raw material and a cBN sintered compact was prepared in the similar manner to Example 1. When the resulting cBN sintered compact was observed by a scanning electron microscope, it was found that the compact was fine as represented by a grain dimater of at most 0.5 μm. In the X-ray diffraction of this cBN, the ratio of (220) diffraction intensity of cBN to (111) diffraction intensity of cBN was found to be 0.18, thus teaching that it was an isotropic sintered compact. The grain diameter, hardness, strength and heat resistance of this cBN sintered compact were similar to those of Example 1.

Comparative Example 1

The same low crystallinity, normal pressure type BN molding as that of Example 1 was charged in a Mo capsule and treated at 6.5 GPa and 2200° C. for 15 minutes in an ultra-high pressure-producing apparatus of Belt type. The resulting cBN sintered compact exhibited a ratio of (220) diffraction intensity of cBN to (111) diffraction intensity of cBN in X-ray Diffraction was found to be 0.18. When the microstructure of this cBN sintered compact was observed by a transmission electron microscope, it was found that the cBN had a grain size of 3 to 5 μm and formed a dense structure of grains bonded with each other and enlarged by crystal growth. In addition, when this hardness was measured by a microknoop indenter, it was high hardness, i.e. 5000 kgf/mm$^2$. The transverse rupture strength of this sintered compact was low, i.e. 70 kgf/mm$^2$ at room temperature and was lowered to 40 kgf/mm$^2$ at a temperature of 1000° C. The thermal conductivity at 50 to 60° C. was 600 W/m·K, while the thermal expansion coefficient measured in a temperature range of 20° C. to 600° C. was $3.4\times10^{-6}$/K.

Comparative Example 2

A commercialy available molded article of pBN was used. This was treated in $N_2$ gas and a high frequency furnace at 2100° C. for 2 hours and the oxygen content was determined by gas analysis to give 0.02 weight %. This was treated at 7.5 GPa and 2100° C. for 15 minutes in an ultra-high pressure-producing apparatus of Belt type. A tenacious cBN sintered compact was obtained, but this cBN sintered compact hardly showed (220) diffraction line in X-ray diffraction. This sintered compact was found to be a highly anisotropic sintered compact selectively orientated in (111) plane direction having a ratio of cBN (220) diffraction intensity/cBN (111) diffraction intensity of at most 0.02. In addition, in the X-ray diffraction, there was found compressed hBN near an interplanar spacing d=3.1Å. When the microstructure of this cBN sintered compact was observed by a transmission electron microscope, it was found that the cBN was so fine as represented by a grain size of at most 0.5 μm and formed a dense structure of grains bonded with each other. In addition, when this hardness was measured by a microknoop indenter, it was high hardness, i.e. 4800 kgf/mm$^2$. The transverse rupture strength of this sintered compact was low, i.e. 82 kgf/mm$^2$ at room temperature. The thermal conductivity measured at 50 to 60° C. was 320 W/m·K, while the thermal expansion coefficient measured in a temperature range of 20° C. to 600° C. was $3.6\times10^{-6}$/K.

Comparative Example 3

A commercialy available molded article of a good crystallinity hBN having a grain diameter of 3 to 10 μm was used as a raw material. This was treated in $N_2$ gas and a high frequency furnace at 2100° C. for 2 hours and the oxygen content was determined by gas analysis to give 0.03 weight %. This was treated at 7.7 GPa and 2200° C. for 15 minutes in an ultra-high pressure producing apparatus of Belt type. A tenacious cBN sintered compact was obtained, but this cBN sintered compact was found to be a highly anisotropic sintered compact selectively orientated in (111) plane direction and composed of large grains of 3 to 5 μm in grain diameter, having a ratio of cBN (220) diffraction intensity/cBN(111) diffraction intensity of at most 0.06 in X-ray diffraction. In addition, in the X-ray diffraction, there was found a micro amount of compressed hBN near a spacing of d=3.1 Å. The transverse rupture strength at room tempearture was 55 kgf/mm$^2$.

Comparative Example 4

A cBN sintered compact was prepared in an analogous manner to Example 1, except that the same normal pressure type BN of a raw material was prepared as in Example 1 and the sintering temperature was adjusted to 1700° C. A fine grain, anisotropic sintered compact was obtained and its hardness was a small, i.e. about 3800 kgf/mm$^2$.

The properties of the foregoing samples are tabulated below:

| Sample No. | Sintering Temp. (° C.) | Crystal Grain Diameter (μm) | cBN X-ray Diffraction Strength Ratio $I_{(220)}/I_{(111)}$ | Thermal Conductivity (W/m · K) | Thermal Expansion Coefficient ($\times 10^{-6}$/K) | Transverse Rupture Strength (Room temp.) (kgf/mm$^2$) | Hardness (kgf/mm$^2$) |
|---|---|---|---|---|---|---|---|
| Example | | | | | | | |
| 1 | 1800 | ≦0.3 | 0.22 | 290 | 3.7 | 110 | 5000 |
| 2 | 1880 | ≦0.5 | 0.12 | 340 | 3.6 | 105 | 5000 |
| 3 | 1950 | 0.5–1 | 0.08 | 380 | 3.5 | 92 | 5050 |
| 4 | 2000 | 0.5–1 | 0.08 | 440 | 3.5 | 88 | 4800 |
| 5 | 1800 | ≦0.5 | 0.26 | 300 | 3.7 | 105 | 5000 |
| 6 | 1800 | ≦0.5 | 0.18 | 290 | 3.7 | 110 | 4900 |
| Comparison Example | | | | | | | |
| 1 | 2200 | 3–5 | 0.18 | 600 | 3.4 | 70 | 5000 |
| 2 | 2100 | ≦0.5 | ≦0.02 | 320 | 3.6 | 82 | 4800 |

-continued

| Sample No. | Sintering Temp. (°C.) | Crystal Grain Diameter (μm) | cBN X-ray Diffraction Strength Ratio $I_{(220)}/I_{(111)}$ | Thermal Conductivity (W/m · K) | Thermal Expansion Coefficient (× $10^{-6}$/K) | Transverse Rupture Strength (Room temp.) (kgf/mm²) | Hardness (kgf/mm²) |
|---|---|---|---|---|---|---|---|
| 3 | 2200 | 3–5 | 0.06 | 580 | 3.3 | 55 | 5300 |
| 4 | 1700 | ≦0.5 | 0.19 | 240 | 4.0 | 70 | 3800 |

Samples of Examples 1–4 and Comparative Examples 1–2 of the cBN sintered compacts shown in Table 1 were used as starting materials and cutting edges of face mill were prepared. A throwaway insert was prepared by brazing each of the above described cBN sintered compacts to a cutting edge holder consisting of a cemented carbide and mounted on a cutter body. As a workpiece to be cut, a plate material of gray cast iron, FC 250, having a cutting surface of 150×25 mm was prepared and then subjected to a cutting property test using a unit cutting surface in the 150 mm direction of the plate material as one pass under cutting conditions of a cutting speed of 1500 m/min, cutting depth of 0.5 mm and feed of 0.15 mm/tooth by wet process. The results are shown in Table 2. The number of passes capable of cutting was determined by the time when the flank wear, width of the cutting edge reached 0.2 mm or cutting was impossible by breakage.

TABLE 2

| Sample No. | Cutting Atmosphere | Workpiece | Number of Passes Capable of Cutting |
|---|---|---|---|
| Example 1 | wet process | cast iron | 300 |
| Example 2 | " | " | 350 |
| Example 3 | " | " | 250 |
| Example 4 | " | " | 270 |
| Comparison Example | | | |
| 1 | " | " | 12 |
| 2 | " | " | 2 |

From Comparative Example 1, it can be considered that the temperature for direct conversion into cBN and sintering was higher, so that the cBN grains were grown to at least 3 μm and the bonding strength of the cBN sintered compact was lower, resulting in breakage of the edge. From Comparative Example 2, it can be considered that since pBN was used as a starting material, the orientation of the crystal grains was so strong that laminar cracks or peelings were liable to occur, leading to early breakage of the edge.

Similarly, Samples of Examples 1–4 and Comparative Examples 1–2 of the cBN sintered compacts shown in Table 1 were used as starting materials and the cutting edges of face milling were prepared. As a workpiece to be cut, a plate material of steel, SCM 415 (hardness HRC 20), having a cutting surface of 150×25 mm, was prepared and then subjected to a cutting property test using a unit cutting surface in the 150 mm direction of the plate material as one pass under cutting conditions of a cutting speed of 500 m/min, cutting depth of 0.4 mm and feed of 0.15 mm/tooth by dry process. The results are shown in Table 3. The number of passes capable of cutting was determined by the time when the flank wear width of the cutting edge reached 0.2 mm or cutting was impossible by breakage.

TABLE 3

| Sample No. | Cutting Atmosphere | Workpiece | Number of Passes Capable of Cutting |
|---|---|---|---|
| Example 1 | dry process | steel | 145 |
| Example 2 | " | " | 160 |
| Example 3 | " | " | 112 |
| Example 4 | " | " | 155 |
| Comparison Example | | | |
| 1 | " | " | 2 |
| 2 | " | " | 0 |

From Comparative Example 1, it can be considered that the temperature for direct conversion into cBN and sintering was higher, so that the cBN grains were grown to at least 3 μm and the bonding strength of the cBN sintered compact was lower, resulting in breakage of the edge. From Comparative Example 2, it can be considered that since pBN was used as a starting material, the orientation of the crystal grains was so strong that laminar cracks or peelings were liable to occur, leading to early breakage of the cutting edge at the start of cutting.

Then, Samples of Examples 1–4 and Comparative Examples 1–2 of the cBN sintered compacts shown in Table 1 were used as starting materials to prepare cutting edges of end mills. An end mill was prepared by brazing each of the above described cBN sintered compacts to a body consisting of a cemented carbide. As a workpiece to be cut, a block material of gray cast iron, FC 250, having a cutting surface of 150×100 mm was prepared and then subjected to a cutting property test using a cutting in the 150 mm direction of the plate material as one pass under cutting conditions of a cutting speed of 500 m/min, cutting depth in the axial direction of 3 mm, cuting depth in the radius direction of 0.1 mm and feed of 0.05 mm/tooth by wet process and by dry process. The results are shown in Table 4. The number of passes capable of cutting was determined by the time when the flank wear width of the cutting edge reached 0.2 mm or cutting was impossible by breakage.

TABLE 4

| Sample No. | Cutting Atmosphere | Workpiece | Number of Passes Capable of Cutting |
|---|---|---|---|
| Example 1 | dry process | cast iron | 1600 |
|  | wet process | cast iron | 2000 |
| Example 2 | dry process | cast iron | 1800 |
|  | wet process | cast iron | 2000 |
| Example 3 | dry process | cast iron | 1700 |
|  | wet process | cast iron | 2000 |
| Example 4 | dry process | cast iron | 1300 |
|  | wet process | cast iron | 1200 |

TABLE 4-continued

| Sample No. | Cutting Atmosphere | Workpiece | Number of Passes Capable of Cutting |
|---|---|---|---|
| Comparison Example | | | |
| 1 | dry process | cast iron | 3 |
|  | wet process | cast iron | 2 |
| 2 | dry process | cast iron | 0 |
|  | wet process | cast iron | 0 |

From Comparative Example 1, it can be considered that the temperature for direct conversion into cBN and sintering was higher, so that the cBN grains were grown to at least 3 μm and the bonding strength of the cBN sintered compact was lower, resulting in breakage of the cutting edge. From Comparative Example 2, it can be considered that since pBN was used as a starting material, the orientation of the crystal grains was so strong that laminar cracks or peelings tended to occur, leading to breakage of the cutting edge during one pass cutting in any of dry process or wet process.

According to a similar means, Samples of Examples 1–4 and Comparative Examples 1–2 of the cBN sintered compacts shown in Table 1 were used as starting materials and end mill edges were prepared. A block material of steel, SCM 415 (hardness HRC 20), having a cutting surface of 150×100 mm, was prepared and then subjected to a cutting property test using a cutting in the 150 mm direction of the plate material as one pass under cutting conditions of a cutting speed of 500 m/min, cutting depth in the axial direction of 2.5 mm and cutting depth in the radius direction of 2.5 mm and feed of 0.15 mm/tooth by dry process. The results are shown in Table 5. The number of passes capable of cutting was determined by the time when the flank wear width of the cutting edge reached 0.1 mm or cutting was impossible by breakage. In this test, the judgment of wear quantity was carried out by 0.1 mm, because when the flank wear width exceeds 0.1 mm, there is a large possibility leading to breakage by increase of the cutting resistance because of the large cutting depth.

TABLE 5

| Sample No. | Cutting Atmosphere | Workpiece | Number of Passes Capable of Cutting |
|---|---|---|---|
| Example 1 | dry process | steel | 380 |
| Example 2 | " | " | 420 |
| Example 3 | " | " | 250 |
| Example 4 | " | " | 300 |
| Comparison Example | | | |
| 1 | " | " | 36 |
| 2 | " | " | 0 |

From Comparative Example 1, it can be considered that the temperature for direct conversion into cBN and sintering was higher, so that the cBN grains were grown to at least 3 μm and the bonding strength of the cBN sintered compact was lower, resulting in breakage of the cutting edge. In Comparative Example 2, pBN was used as a starting material and the orientation of the crystal grains was so strong that laminar cracks or peelings tended to occur, leading to breakage of the cutting edge during one pass cutting.

Then, Samples of Examples 1 and 5–6 and Comparative Examples 1–4 of the cBN sintered compacts shown in Table 1 were used as starting materials to prepare cutting edges of precision cutting tools. A cutting tool having a nose radius of 0.1 mm in cutting edge was prepared by brazing each of the above described cBN sintered compacts to a shank consisting of a cemented carbide and the cutting edge was ground by a diamond wheel of # 8000. When the cutting edge was observed by a microscope, it was found very sharp. The surface roughness of the clearance face measured was at most 0.01 μm. For comparison, when a similar edge working was carried out with a commercially available cBN sintered compact containing a binder, the surface roughness of the flank face was about 0.02 to 0.03 μm.

Using the thus obtained cutting tool, a precision cutting test of SUS 420 J2 (HRC 53) was carried out under conditions of a cutting speed of 30 m/min, cutting depth of 0.005 mm and feed of 0.005 mm/rev. The results are shown in Table 6.

TABLE 6

| Sample No. | Cutting-Possible Distance (m) (Judgment of Life: Rmax 0.1 μm) |
|---|---|
| Example 1 | 950 |
| Example 5 | 1100 |
| Example 6 | 900 |
| Comparative Example | |
| 1 | 20 |
| 2 | 0 |
| 3 | 150 |
| 4 | 300 |

In Example 1 and Examples 5–6, the tool life capable of maintaining a cut surface roughness of 0.1 μm Rmax was about 1000 m by a cutting distance.

When the same cutting property was estimated by a cBN single crystal tool, for comparison, its tool life was at most 200 m. In Comparative Example 1, it was considered that cBN grains were grown in a grain size of at least 3 μm, so the bonding strength of the cBN sintered compact was low, fine chipping took place at the initial stage and precise working was impopssible. In Comparative Example 2, the cutting edge was instantaneously broken. In view of the broken edge, there were found a number of laminar stripped areas. Since pBN was used as a starting material, the orientation of the crystal grain was so strong that laminar cracks and stripping often took place, resulting in breakage of the cutting edge at the initial period. In Comparative Example 3, breakage occurred after several minutes, probably due to laminar stripping of the cutting edge. This is such a result that commercially available molded articles of good crystallinity hBN having a grain diameter of 3 to 10 μm were used as a raw material, so that there was formed a sintered compact comprising cBN coarse grains having a grain size of 3 to 5 μm and an orientation property, whereby the bonding strength of the cBN sintered compact was small and laminar carckas were liable to occur. In Comparative Example 4, the similar procedure to Example 1 was repeated except that using the same raw material, low pressure phase BN, as that of Example 1, the sintering temperature was adjusted to 1700° C., thus obtaining fine and isotropic sintered compact having a low hardness, i.e. 3800 kg/mm$^2$, whose wear resistance was not sufficient.

Summing up and estimating the results of Table 2 to Table 6, it is apparent that the cBN sintered compact of the present invention is suitable for high speed milling of cast irons or steels and precision cutting of ferrous materials. In the case of a milling cuttering tool, the cBN sintered compact is capable of exhibiting more excellent heat resistance under conditions by wet process than cutting edges obtained from cBN sintered compacts outside the scope of the production process of the present invention or cBN sintered compacts of the prior art, used as a raw material, and capable of maintaining effective cutting property even under conditions by dry process without needing any cutting fluid, exhibiting more excellent cutting property under various conditions and reducing the cost for the countermeasure of environment. In the case of a precision cutting tool, on the other hand, the cBN sintered compact is capable of providing a tool suitable for precision working, having a very sharp cutting edge and excellent strength as well as wear resistance.

Utility and Possibility on Commercial Scale

The cubic boron nitride sintered compact of the present invention contains no binder, comprises cBN of at most 1 µm, contains no impurities at grain boundary and has an isotropic structure, such as exhibiting a high thermal conductivity and low thermal expansion coefficient and being excellent in strength as well as wear resistance, which is suitable for use as milling cutting tools such as face milling cutters or end mills and capable of achieving a number of cutting passes without breakage of cutting edge in high speed cutting. When cBN has an average grain size of at most 0.5 µm, in particular, there can be obtained a tool having a sharp cutting edge and higher strength and wear resistance, which can preferably be applied to a precision cutting working tool for ferrous materials.

What is claimed is:

1. A cutting tool comprising, as an edge part, a cubic boron nitride sintered compact containing cubic boron nitride having an average grain diameter of at most 1 µm, in which the cubic boron nitride sintered compact has, at the said edge part, an $I_{(200)}/I_{(111)}$ of (220) diffraction intensity ($I_{(200)}$ to (111) diffraction intensity $I_{(111)}$ ratio of at least 0.05 in X-ray diffraction of arbitrary direction and impurities are substantially not contained in the grain boundaries, wherein the traverse rupture strength of the said cubic boron nitride sintered compact is at least 80 kgf/mm$^2$ by a three point bending measurement at a temperature between 20° C. and 1000° C. and the thermal conductivity of the cubic boron nitride sintered compact, at the said edge part, is 250 to 1000 W/m·K.

2. The cutting tool as claimed in claim 1, wherein the hardness of the cubic boron nitride sintered compact, at the said edge part, is at least 4000 kgf/mm$^2$ at room temperature.

3. The cutting tool as claimed in claim 1, wherein the thermal conductivity of the cubic boron nitride sintered compact, at the said edge part, is 300 to 1000 w/m·K.

4. The cutting tool as claimed in claim 1, wherein the thermal expansion of the cubic boron nitride sintered compact, at the said edge part is 3.0 to 4.0×10$^{-6}$/K at a temperature ranging from 20° C. to 600° C.

5. The cutting tool as claimed in claim 1, which is applied to a face milling cutter or end mill for high speed cutting cast irons or steels.

6. The cutting tool as claimed in claim 1, wherein the cubic boron nitride sintered compact, at the said edge part, contains cBN with an average grain diameter of at most 0.5 µm.

* * * * *